UNITED STATES PATENT OFFICE.

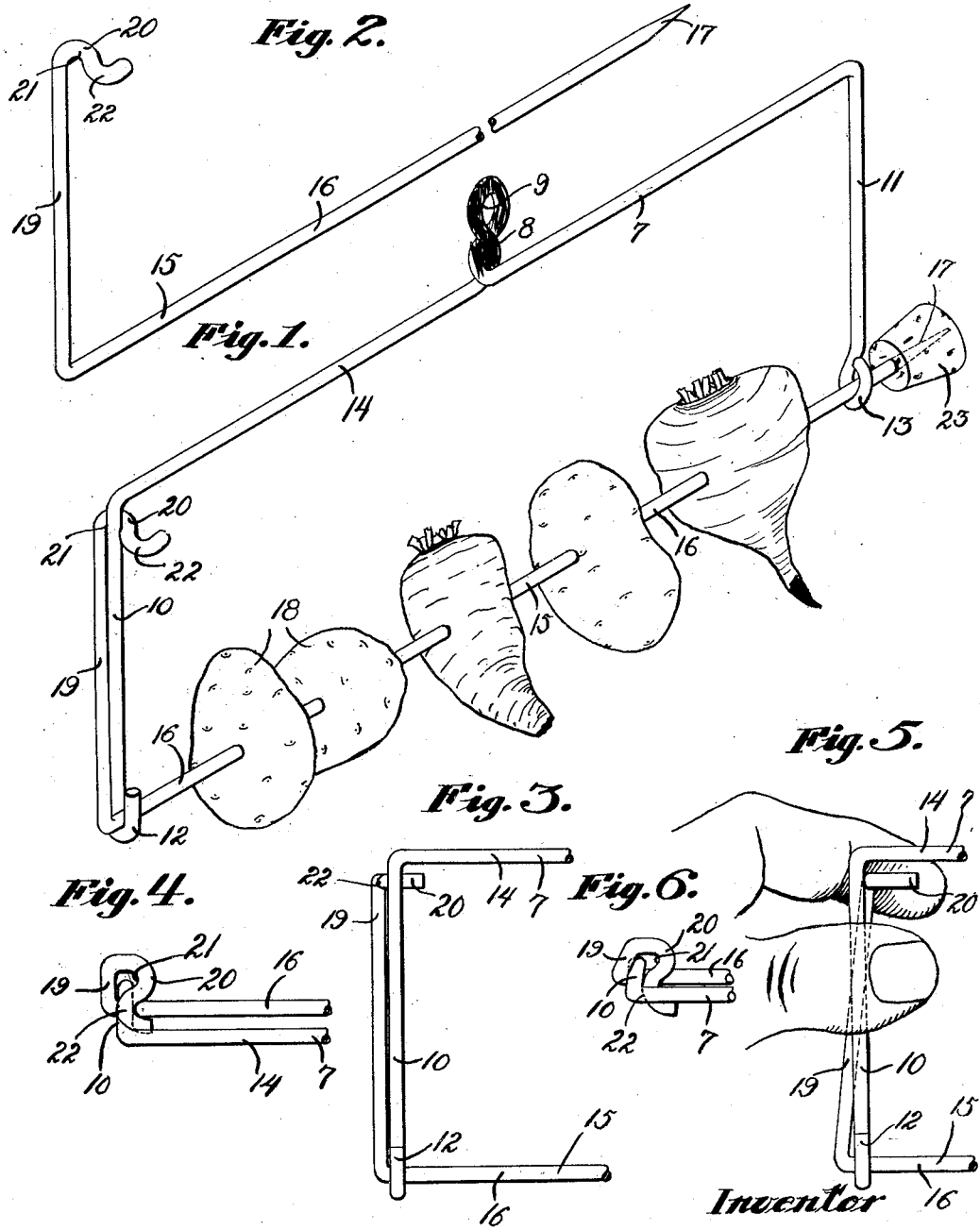

GEORGE N. BOOTHE, OF MEDIA, PENNSYLVANIA.

FOOD-HOLDER FOR POULTRY, &c.

1,369,079.

Specification of Letters Patent.   Patented Feb. 22, 1921.

Application filed April 12, 1920.   Serial No. 373,262.

*To all whom it may concern:*

Be it known that I, GEORGE N. BOOTHE, a citizen of the United States, residing at Media, in the county of Delaware and State of Pennsylvania, have invented certain new and useful Improvements in Food-Holders for Poultry, &c., of which the following is a specification.

One object of my invention is to provide an improved holder for vegetables or other food so that the latter can be picked and eaten by poultry or small animals.

Another object is to so construct my improved holder that said food can be easily and quickly fastened thereto and so that the holder can be easily suspended or otherwise secured to a supporting structure.

A further object is to so arrange the parts of my improved holder that they will be extremely durable and can be easily made.

These objects, and other advantageous ends which will be described hereinafter, I attain in the following manner, reference being had to the accompanying drawings in which—

Figure 1 is a perspective view of my improved holder showing the same supporting a number of vegetables and of a design which can be suspended from an overhead hook or other supporting structure; the vegetables being confined between parts of the holder so that they cannot readily be pulled therefrom, Fig. 2 is a perspective view of one of the readily detached parts of my improved holder, Fig. 3 is a fragmentary elevation of a portion of the holder showing the same with the parts ready to be locked together, Fig. 4 is a top plan view of Fig. 3, Fig. 5 is a fragmentary elevation showing the simple manual operation necessary to lock the parts after they have been placed in the position shown in Figs. 3 and 4, and Fig. 6 is a top plan view of Fig. 5; the illustration of the fingers being omitted.

My improved holder can be made entirely from heavy wire and as illustrated in the drawings the same consisting of a suspending yoke 7 which is made of a single piece of wire which is twisted at 8 to provide an eyelet 9 by which the same can be suspended on an overhead hook or any other supporting structure. The yoke 7 has leg portions 10 and 11; the leg portion 10 at its bottom end being provided with an upturned hook 12. The leg portion 10 at its bottom end is turned to form an eyelet 13. The leg portions 10 and 11 depend from an overhead rod portion 14 which normally is arranged horizontally; the suspending eyelet 9 being arranged centrally between the two leg portions 10 and 11 so that the weight is evenly balanced at each side of the eyelet. A food securing portion 15 is also made of wire and includes a food supporting bar 16 which is pointed at one end as shown at 17. By thus pointing the end 17, vegetables or the like as illustrated at 18 in Fig. 1 can be pierced by the pointed end 17 and slide upon the bar 16. The portion 15 has an arm 19 bent at an angle to the bar 16; said portion 15 being preferably made of wire which has a certain amount of resiliency. The upper end portion of the arm 19 is bent in the form of a compound or ogee curve 20; the curved portion extending transversely to the length of the bar 16 as clearly shown in Figs. 4 and 6. By thus curving the portion 20, a recess or notch 21 is provided and a bulged portion 22 projects in front of the notch 21 for a purpose hereinafter described.

Considering that articles of food, such as shown at 18, are to be secured to the holder and that the portion 15 is separated from the yoke 7, the articles 18 are pierced by the end 17 of the bar 16 and slide upon the latter. The pointed end 17 is then extended through the eyelet 13 and the portion of the bar 16 adjacent the arm 19 is placed within the up-turned hook 12 in a manner shown in Figs. 3 and 4. The arm 19 is shorter than the leg portion 10 of the yoke 7 so that the curved portion 20 of the arm 19 is at a level lower than the rod portion 14 of the yoke 7. However, the bulged portion 22 is normally in the plane of the leg portion 10 and in order to lock the food securing portion to the yoke it is necessary to swing the bar 16 in the hook 12 and eyelet 13 as bearings and at the same time to bend the arm 19 as shown in Figs. 5 and 6 to permit the bulged portion 22 to pass to the inner side of the leg portion 10 until the entire bulged portion has passed entirely between the leg portions 10 and 11 and under the rod portion 14, after which the arm 19 can be permitted to spring back to its position occupied before being bent and in so doing the leg portion 10 adjacent its top will be confined in the notch 21 and thereby lock the food securing portion 15 to the yoke 7.

The above described locking action can be done very quickly; it merely being necessary as clearly illustrated in Fig. 5 to slightly flex or bend the arm 19 so that the flange portion can be pushed through the yoke between the leg portions 10 and 11, after which upon manual releasing of the parts the arm 19 and bent portion 22 will spring to their normal positions and thereby lock the parts as above described.

To release the food securing portion 15 from the yoke it is merely necessary to push the bulged portion 22 of the arm 19 backwardly through the yoke after which the entire rod 19 can be lifted from the hook 12 and pulled out of the eyelet 13.

If desired a cork 23 can be placed over the pointed end 17 so as to protect the poultry against the sharp point thereof.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A food holder of the character described including a separate supporting bar adapted to pierce and thereby permit articles of food to be placed thereon; a supporting member having an eyelet and a hook spaced apart forming a bearing for said bar; and means for securing said bar to said member; substantially as described.

2. A food holder of the character described including a supporting bar adapted to pierce and thereby permit articles of food to be placed thereon; and a supporting member having an eyelet and a hook spaced apart forming a bearing for said bar and permitting the bar to be detached from said supporting member, said bar having a portion adapted to be sprung into locking engagement with said supporting member substantially as described.

3. A food holder of the character described including a supporting bar adapted to pierce and thereby permit articles of food to be placed thereon; a supporting member having an eyelet and a hook spaced apart forming a bearing for said bar, said bar having an arm provided with a curved part including a notch; and a bulged portion projecting in front of said notch whereby the notch is located between the arm and the bulged portion, said bulged portion being adapted to be forced over a part of said member whereby said part of the member will be confined in said notch to secure said bar and member together; substantially as described.

4. A food holder of the character described including a yoke having a rod portion including depending leg portions, one of said legs having an eyelet thereon, the other of said legs having an up-turned hook; a food supporting bar adapted to have a portion projected through said eyelet and another portion to rest in said hook, said bar having an up-turned arm provided with a curved part including a bulged portion; and a notch between the bulged portion and the arm whereby the bulged portion can be moved between said leg portions of the yoke to permit one of said leg portions to engage said notch; substantially as described.

In testimony whereof I have signed my name to this specification in the presence of two subscribing witnesses.

GEORGE N. BOOTHE.

Witnesses:
J. EUGENE WALKER,
ETHEL R. BOOTHE.